H. BARLOW.
Hay-Elevator.
No. 212,427. Patented Feb. 18, 1879.
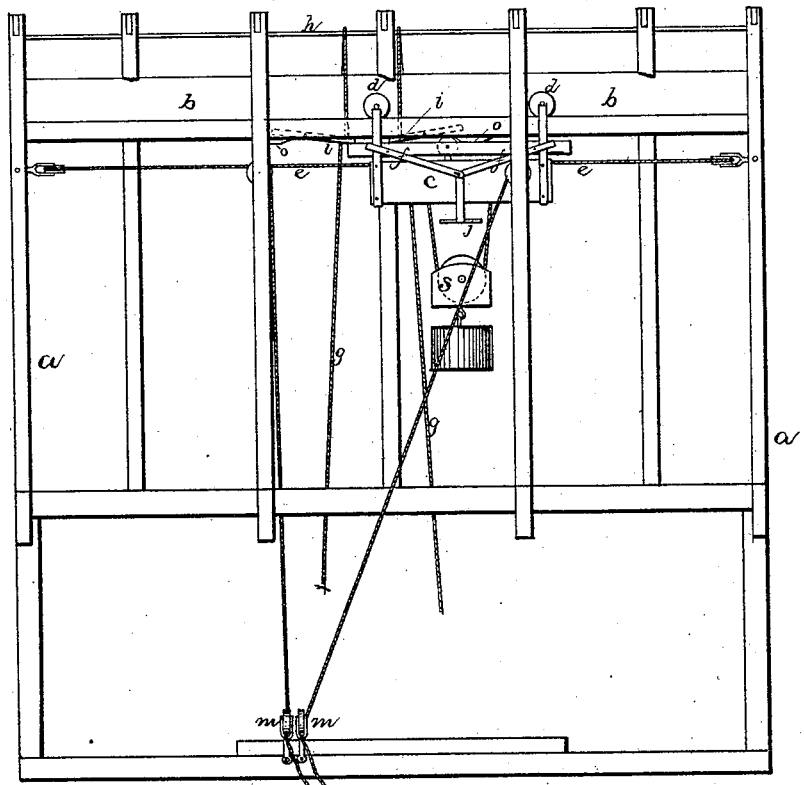
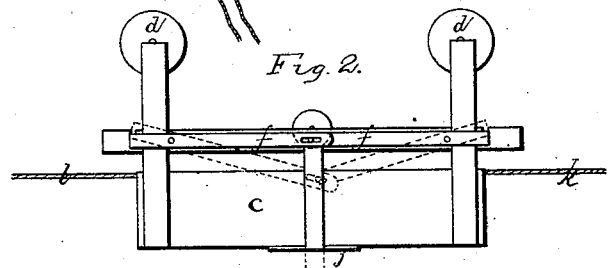

UNITED STATES PATENT OFFICE.

HARVEY BARLOW, OF CROOKED HILL, PENNSYLVANIA.

IMPROVEMENT IN HAY-ELEVATORS.

Specification forming part of Letters Patent No. 212,427, dated February 18, 1879; application filed December 30, 1878.

*To all whom it may concern:*

Be it known that I, HARVEY BARLOW, of Crooked Hill, in the county of Montgomery and State of Pennsylvania, have invented certain new and useful Improvements in Hay-Elevators; and I do hereby declare the following to be a full, clear, and exact description of the invention, such as will enable others skilled in the art to which it pertains to make and use it, reference being had to the accompanying drawings, which form part of this specification.

My invention relates to an improvement in hay-elevators; and it consists in the arrangement and combination of parts whereby the hay can be easily and quickly elevated, and the carriage operated equally as well from either side of the mow, as will be more fully described hereinafter.

Figure 1 is a side elevation of my invention. Fig. 2 is a side view of the same. Fig. 3 is a plan view of the carriage. Fig. 4 is a longitudinal vertical section.

$a$ represents the frame-work of an ordinary barn; $b$, the flanged track; $c$, the carriage; $d$, its supporting rollers or wheels, and $e$ the ropes for drawing the carriage back and forth on the track.

In the under side of the track are made two recesses, in which are pivoted the two stops $i$, which have their lower ends inclined downward toward each other, as shown, and which catch behind the ends of the levers $f$ on the carriage, for the purpose of temporarily locking the carriage in place while being loaded. These stops may act entirely from their own gravity, or may be provided with springs to make them act more surely, and each one has a rope, $g$, connected to it, which rope passes up through a hole in the track, up over the rod $h$, and then down to the operator on the floor. As the unloaded carriage runs under one of these stops the stop rises upward and then drops down behind the lever $f$, so as to hold the carriage in place until the rope $g$ connected to that stop is pulled, so as to raise the stop up out of the way.

When it is desired to change the carriage from one side of the barn to the other, so as to raise the hay to the opposite end of the mow, the stop in the way may be drawn up by its rope or wire, or, if the load on the fork is raised by the forward motion of the horse until it strikes the under side of the plate $j$, the inner ends of the levers $f$ will be raised upward, thereby depressing the outer ends, so as to allow the carriage to run under both stops without interfering, thus permitting the carriage to be drawn toward either end of the mow, according as the animal is hitched to the rope $k$ or $l$. Each of these ropes $k$ and $l$ are passed over suitable pulleys up in the rafters, and then pass down under the two pulleys $m$, placed side by side.

In the lower part of the center of the carriage is pivoted the lever $n$, which is the shape of an inverted letter T, and which has its upper end provided with a friction-roller projecting above the top of the carriage, so as to strike against one of the projections $o$ on the under side of the track $b$. Pivoted on each side of the lever $n$, near enough for the arm $q$ of the lever to bear upon, is a dog, $r$, the upper end of which bears against the rope which supports the hook and pulley $s$ where it passes up over the pulleys $t$ in the carriage. Bearing upward against the lower ends of these dogs, so as to hold their upper ends pressed against the rope, is the double spring $u$, either of the shape shown or any other that may be preferred.

Pivoted in the upper part of the carriage is a second set of dogs, $v$, the lower ends of which bear down upon the upper ends of the dogs $r$. In between the two dogs $v$ is placed a suitable spring, $w$, which holds their shorter ends pressed tightly against the rope some little distance above where the dogs $r$ catch it, so that while the lower set of dogs prevent the rope from being drawn downward, the upper set prevent it from being drawn outward through the carriage.

Thus it will be seen that after the load has been elevated it is locked immovably in place and the whole weight taken from the horse, who then has nothing to do but drag the carriage along the track to the back end of the mow.

As the carriage comes back to the loading-point, which is in the center of the barn, where a double rigging is used, as here shown, the upper end of the lever $n$ comes in contact with one of the projections $o$, and by forcing the lever to one side causes the arm $q$ to bear against the dog $r$, and thus press back both dogs $r$ and $v$ from the rope on that side to let the pulley-block descend with the fork for another load, while the two dogs hold the rope tightly on the other side. As long as the upper end of the lever is in contact with the projection $o$ the load can be raised and lowered at will; but as soon as the load has been raised upward against the plate $j$, and the carriage moved endwise far enough to release the end of the lever, the dogs are at once freed, and again catch the load and hold it, so that it can neither be raised nor lowered while the car is at a distance from its starting-point.

Thus far the elevator has been described as being double. Should it be desired to work it single only, the rope, dogs, and pulleys are done away with at one end, and the usual rope and pulley substituted, and the elevator then works as well single as double.

A pulley (not shown here) will be fastened to a post at a suitable distance outside of the pulleys $m$ for the rope to pass through.

Having thus described my invention, I claim—

1. The beam $b$, having the projections $o$ on its under side and the stops $i$, in combination with a carriage having a pivoted lever, $n$, projecting above its top, and which lever is operated by the projections, and in turn operates the dogs so as to release the rope, substantially as shown.

2. The combination of the pivoted lever $n$ with a double set of catches, whereby the rope is prevented from being moved in either direction until the lever is moved, substantially as shown.

In testimony that I claim the foregoing I have hereunto set my hand this 13th day of December, 1878.

HARVEY BARLOW.

Witnesses:
R. BROOK EVANS,
JOHN EVANS.